United States Patent [19]

Matsukane et al.

[11] Patent Number: 4,810,150

[45] Date of Patent: Mar. 7, 1989

[54] CERAMIC FIBER LAYER FIXING PIN

[75] Inventors: Tetsuyoshi Matsukane, Sakado; Kenji Arai, Narita, both of Japan

[73] Assignee: Toshiba Monofrax Company, Ltd., Chiba, Japan

[21] Appl. No.: 869,842

[22] Filed: May 28, 1986

Related U.S. Application Data

[62] Division of Ser. No. 625,297, Jun. 26, 1984, abandoned.

[51] Int. Cl.[4] ............................................. F16B 19/00
[52] U.S. Cl. .................................... 411/508; 411/456; 411/913; 52/410
[58] Field of Search .................. 411/21, 340, 341, 446, 411/450, 451, 456, 447, 904, 906, 907, 908, 913, 922, 508–520; 52/404, 410, 506, 511

[56] References Cited

U.S. PATENT DOCUMENTS

| | | | |
|---|---|---|---|
| 720,225 | 2/1903 | Clum | 411/451 X |
| 838,203 | 12/1906 | Neil | 411/922 X |
| 865,610 | 9/1907 | Pullets | 411/922 X |
| 875,779 | 1/1908 | Clover | 411/456 |
| 1,139,337 | 5/1915 | Brown | 411/341 |
| 1,213,787 | 1/1917 | Woodbury | 411/451 |
| 1,648,855 | 11/1927 | Lymon | 411/446 |
| 2,523,239 | 9/1950 | Tinnerman | 411/508 |
| 2,530,229 | 11/1950 | Clark | 411/451 |
| 2,614,450 | 10/1952 | Oltz et al. | 411/456 |
| 2,618,297 | 11/1952 | Sosselin | 411/922 X |
| 3,605,366 | 9/1971 | Zakim | 52/410 |
| 3,894,467 | 7/1975 | Brescia | 411/922 X |
| 3,929,311 | 12/1975 | Solo | 411/908 X |
| 4,018,023 | 4/1977 | Anderson | 52/410 |
| 4,030,261 | 6/1977 | Coleman | 411/922 X |
| 4,045,168 | 8/1977 | Abrial | 52/506 |
| 4,139,975 | 2/1979 | Bailer | 411/451 X |
| 4,495,380 | 1/1985 | Ryan et al. | 411/508 X |

FOREIGN PATENT DOCUMENTS

| | | |
|---|---|---|
| 48-39291 | 11/1973 | Japan . |
| 51-11807 | 4/1976 | Japan . |
| 53-128931 | 10/1978 | Japan . |
| 58-51198 | 4/1983 | Japan . |
| 12277 | of 1904 | United Kingdom ............... 411/484 |
| 614921 | 12/1948 | United Kingdom ............... 411/451 |
| 1268022 | 3/1972 | United Kingdom . |
| 1359291 | 7/1974 | United Kingdom . |

Primary Examiner—Neill Wilson
Attorney, Agent, or Firm—Oblon, Fisher, Spivak, McClelland, & Maier

[57] ABSTRACT

A pin for fixing an innermost ceramic fiber layer of a plurality of ceramic fiber layers so as to line a furnace wall to at least one other ceramic fiber layer of the plurality of ceramic fiber layers, situated at a side of the furnace wall with respect to the innermost ceramic fiber layer by being inserted from the innermost ceramic fiber layer into the other ceramic fiber layer.

10 Claims, 4 Drawing Sheets

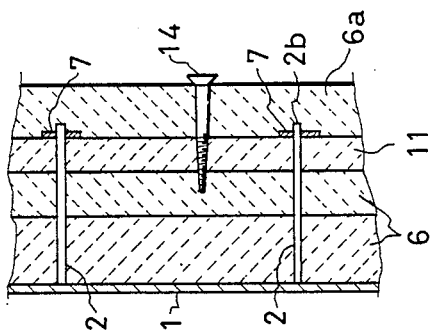
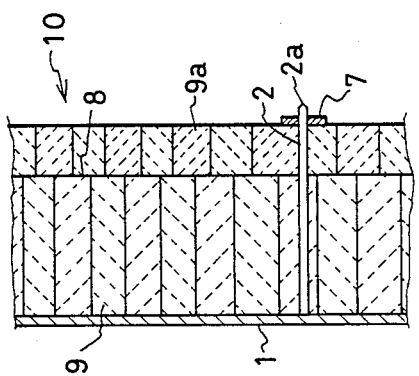
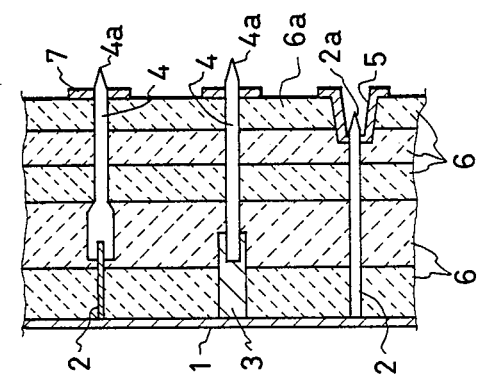

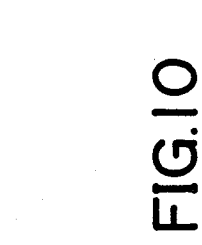
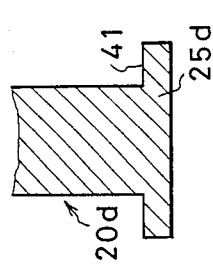
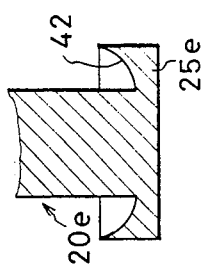
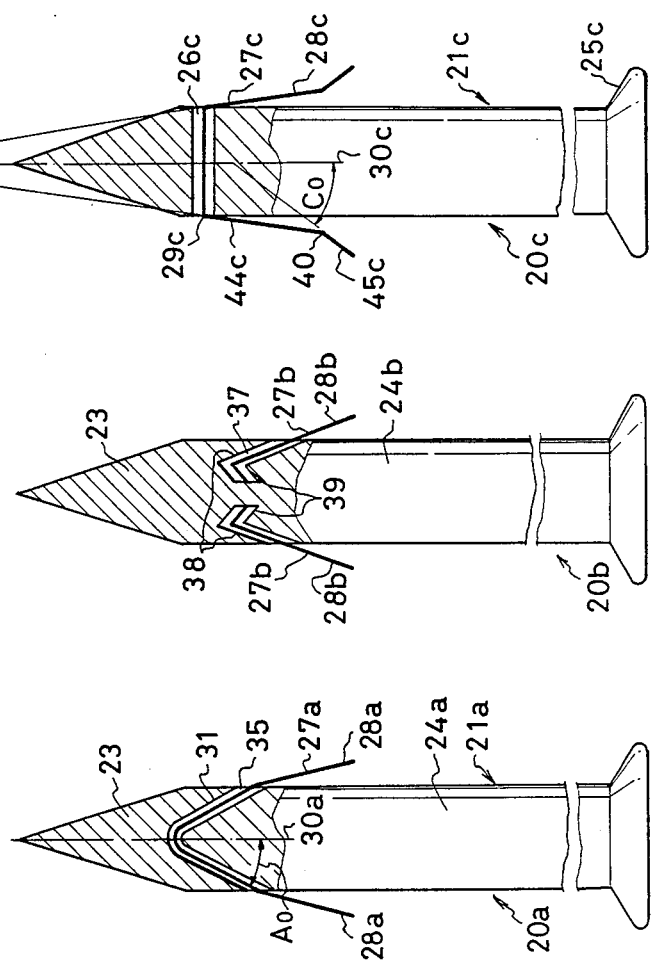
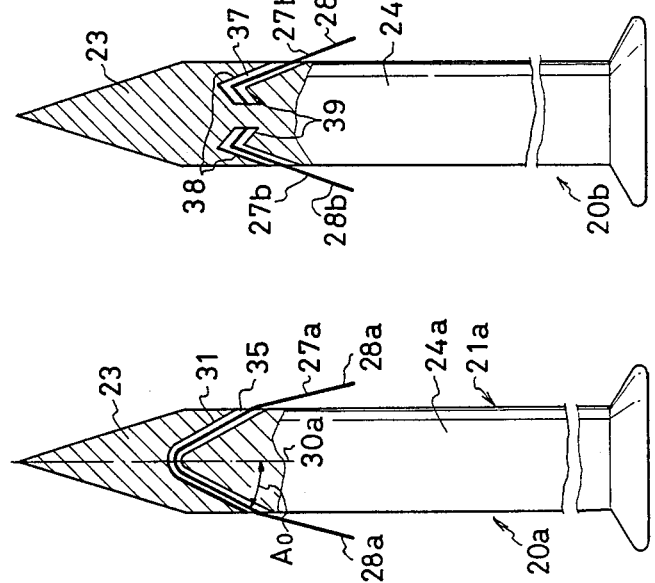

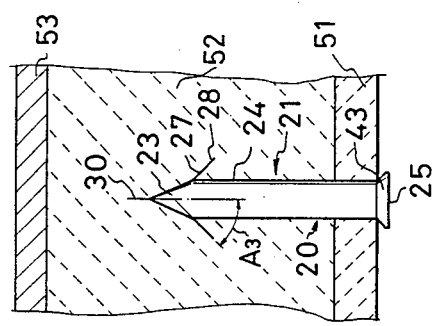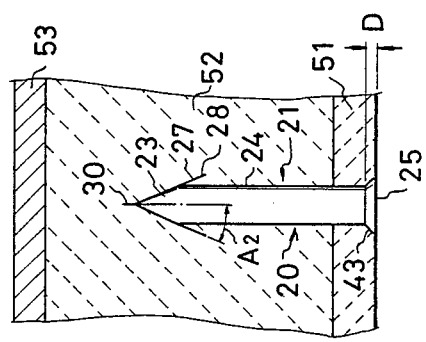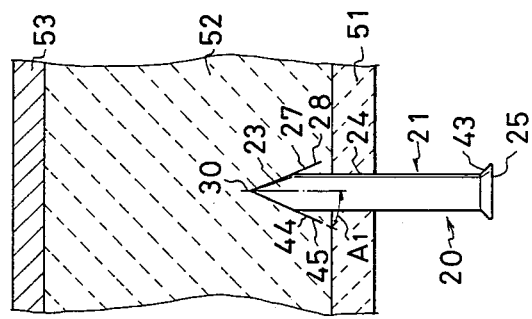

4,810,150

CERAMIC FIBER LAYER FIXING PIN

This application is a division of application Ser. No. 625,297 filed June 26, 1984 now abandoned.

BACKGROUND OF THE INVENTION

1. Field of the Invention

This invention relates to a pin for fixing to each other the laminate layers having compressibility and elasticity. More particularly, the invention relates to a pin for fixing the innermost ceramic fiber layer to other outer wall side ceramic fiber layers or a plurality of such layers lining the wall of a furnace.

2. Description of the Prior Art

Hitherto, in case of lining a furnace by laminating ceramic fiber layers at a inner side of an outer wall of the furnace, it has been required to support the ceramic fiber layers to a casing of the furnace by use of some supporting means. The method has been employed in the conventional furnace in which the ceramic fiber layers have been supported to the casing by a metallic pin welded to the casing. In this method, the allowable temperature of the furnace has been limited by the endurable temperature of the metallic pin, because the end portion of the pin at the inner side of the furnace has been oxidized by exposure to the high temperature environment. In case of using the pin in the environment above the allowable temperature, the method has been known in which a metallic pin having a heat resistant ceramic pin-like member connected to the metallic pin at the end potion thereof.

For instance, as illustrated in FIG. 1, the laminate of ceramic fiber layers 6 is pressed against any one of the fixing means each comprising a metallic pin-like fixing member 2 welded to the casing 1 and another pin-shaped member 4 having a tapered end 4a and joined to said member 2, or the fixing means each comprising a pipe-like member 3 welded to the casing 1 and a pin-shaped member 4 having a tapered end 4a and joined to said pipe-like member 3, or the fixing means each welded to the casing 1 and having a tapered end 2a, so that said fixing means pierce through said laminate layers with the tapered end 4a or 2a of each said fixing means projecting out from the innermost ceramic fiber layer 6a, and then a ceramic cup-shaped member 5 or a fastening member is secured around the projecting tapered end thereby said laminated ceramic fiber layers 6 are fixed to the casing 1.

Furthermore, blanket type or other type ceramic fiber layers are known. For instance, as illustrated in FIG. 2, a laminate 10 comprising the layer-built ceramic fiber blocks 9 on the furnace wall side and the layer-built ceramic fiber blocks 9a on the inner side of the furnace, each of blocks 9 and 9a being bonded together by an adhesive 8, is pressed against the tapered end 2a of each pin-shaped fixing means 2 which is welded to the casing 1, so that each said pin-shaped fixing means pierces through the laminate 10 with the tapered end 2a of each said fixing means projects out from the laminate 10, and then a metallic fastening member 7 is secured around the projecting tapered end thereby said ceramic fiber blocks 9 and 9a are secured to the casing 1.

In still another known method, as illustrated in FIG. 3, the ceramic fiber layers 6 and another ceramic intermediate layer 11 harder than said ceramic fiber layers 6 are pressed against the metallic pin-shaped fixing means 2 welded to the casing 1 so that said fixing means 2 pierces through said layers 6 and 11 with the other end 2b of each said fixing means 2 projecting out from the intermediate layer 11 and then a metallic fastening member 7 is secured around the projecting end 2b of each said fixing means 2 to fix said ceramic fiber layers 6 and intermediate layer 11 to the casing 1, and then the innermost ceramic fiber layer 6a is fixed to the intermediate layer 11 by the threaded ceramic pins 14 which are screwed into the layers 6 and 11 (at least into the intermediate layer 11) through the innermost ceramic fiber layer 6a.

In these methods, however, the operation of pressing the ceramic fiber layers 6 and 6a or a laminate 10 of ceramic fiber blocks 9 and 9a against the fixing means (comprising pin-shaped members 2, 4 and/or pipe-shaped member 3) to let said fixing means pierce through said layers 6, 6a or said laminate 10 so that the tapered end 2a or 4a or the end 2b of each said fixing means projects out from the innermost ceramic fiber layer 6a or the innermost ceramic fiber block 9a has been quite troublesome and time-consuming. Also, in case of using a ceramic intermediate layer 11, in addition to the troublesome and time-consuming operation for pressing the intermediate layer 11 against the pin-shaped fixing means 2 so that its end 2b projects from said layer 11, there has been also the problem that the ceramic pins 14 could become loose or come off the intermediate layer 11 because of its fragility.

SUMMARY OF THE INVENTION

The present invention has been conceived in consideration of said prior art defects, and the invention has for its object to provide a pin for fixing the ceramic fiber layers lining a furnace wall, which pin can be easily inserted into the at least one ceramic fiber layer from the innermost ceramic fiber layer and is thereby capable of securely fixing the innermost ceramic fiber layer to the other ceramic fiber layer.

According to this invention, said object can be attained by providing a pin for fixing an innermost ceramic fiber layer of a plurality of ceramic fiber layers so as to line a furnace wall to at least one other ceramic fiber layer, of said plurality of ceramic fiber layers, situated at a side of the furnace wall with respect to said innermost ceramic fiber layer by being inserted from said innermost ceramic fiber layer into said other ceramic fiber layer, said pin comprising: a pin body having a basal portion adapted to allow said insertion into said other ceramic fiber layer from the innermost ceramic fiber layer at one end side thereof, and an enlarged portion adapted to inhibit said insertion at a desired depth at an other end side thereof when said basal portion has been inserted into said other ceramic fiber layer from said innermost ceramic fiber layer, and an elastic catch provided on said pin body at said one end side and adapted to be elastically deformable so that when the pin body has been inserted into the other ceramic fiber layer from the innermost layer and such insertion has been inhibited by said enlarged end portion, said elastic catch becomes fixed in the other ceramic fiber layer to prevent the pin body from removal from said innermost ceramic fiber layer and said other ceramic fiber layers.

Said ceramic fiber layers preferably have compressibility and elasticity. Said enlarged end portion of the pin body is so designed that it compresses the innermost ceramic fiber layer to produce elastic strain in said innermost layer and inhibits the pin from getting into the lining ceramic fiber layers deeper than the innermost layer when the pin has been inserted into said other ceramic fiber layer from the innermost ceramic fiber layer. Said enlarged end portion of the pin body is also adapted to receive the force acting to pull back said pin body toward its enlarged end side when te elastic strain of the compressed innermost ceramic fiber layer is released.

Said elastic catch preferably projects out sidewise from the basal portion of the pin body. When the pin has been inserted into the other ceramic fiber layer from the innermost layer, said catch is elastically deformed so as to come closer to the pin body to facilitate said insertion, and when the elastic strain in said innermost ceramic fiber layer is released, said catch is now elastically deformed to go away from said pin body.

The basal portion of said pin body is preferably tapered off to facilitate the insertion of the pin into the other ceramic fiber layer from the innermost ceramic fiber layer.

The enlarged end portion of the pin body preferably has an abutment surface which abuts against the innermost ceramic fiber layer, and this abutment surface may be so formed as to increase diametrically at the end side of the enlarged portion so as to compress said innermost ceramic fiber layer. Said abutment surface may also be formed flat to compress said innermost ceramic fiber layer or may be so designed as to rise up to said one end side at diametrically outer side thereof.

Said pin body preferably has a through-hole which extends laterally through said pin body, and said elastic catch can be an elongated elastic member passed through said hole, said elastic member projecting out from both ends of said through-hole.

Said through-hole preferably extends transversely to the longitudinal direction of the pin body. Said through-hole may be so formed that the projecting portions of said elastic member slant in the direction of the enlarged end of the pin body. The elastic member and said pin body are preferably secured to each other by an adhesive in said through-hole. The pin body may have a recession, instead of said through-hole, close to its tapering end. In this case, said elastic member is set in this recession. Said elastic member is preferably made of a metal and said pin body is preferably made of a ceramic material. Stainless steel is preferred as the metal material for said elastic member. Silicon carbide ceramic is recommended as the ceramic material for the pin body. Silicon nitride ceramic is also usable as said ceramic material. Cement mortar is preferred as the adhesive used for securing said elastic member and pin body to each other.

Another object of this invention is to provide a pin for fixing one fiber layer of a plurality of fiber layers to at least one other fiber layer adapted to be run into the other fiber layer from the one fiber layer said pin being comprised: a pin body having a basal portion adapted to allow the insertion into the other fiber layer from said one fiber layer and an enlarged end portion adapted to inhibit said insertion at a desired depth at the other end side of the pin body when said basal portion is inserted into said other fiber layer from said one layer; and an elastic catch provided at one end side of said pin body and adapted to be elastically deformable so that when said pin body has been inserted from said one fiber layer into said other layer and such insertion has been inhibited by said enlarged end of the pin body, said elastic catch is anchored to said other fiber layer to prevent said pin body from removal from said one fiber layer and said other fiber layer.

A further object of this invention is to provide a fixing pin comprised a pin body having an enlarged portion at one end of its basal portion, and an elastic catch provided on said pin body on its end side opposite from said enlarged end, said elastic member being elastically deformable so that the end of said elastic member will come close to the pin body when said pin body is being inserted into a material to be fixed, and that end of said elastic member will go away from said pin body when the pin body is forced back oppositely to the insertion direction.

DESCRIPTION OF THE DRAWINGS

This invention is to be described in more details referring to the accompanying drawings, by which the foregoing and other objects, as well as the features of this invention will be made clearer in which:

FIG. 1, FIG. 2 and FIG. 3 are the schematic illustrations of the conventional fixing means for fixing the ceramic fiber layers.

FIG. 7, FIG. 8 and FIG. 9 are the schematic illustrations of a ceramic fiber layer fixing pin according to another embodiment of this invention.

FIG. 10 and FIG. 11 are the schematic illustrations of the enlarged portions of the ceramic fiber layer fixing pins according to other preferred embodiments of this invention.

FIG. 12, FIG. 13 and FIG. 14 are the sequential illustrations showing the process of fixing the innermost ceramic fiber layer to other ceramic fiber layers lining the furnace wall by using the ceramic fiber layer fixing pin shown in FIGS. 4 and 5.

DETAILED DESCRIPTION OF PREFERRED EMBODIMENTS

A preferred embodiment of fixing pin according to this invention will be described with reference to FIGS. 4 and 5.

Figure 5:
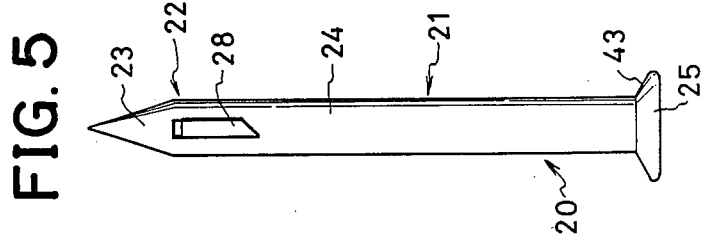
FIG. 4 and FIG. 5 are a front view and a side view, respectively, of a ceramic fiber layer fixing pin according to a preferred embodiment of this invention.
Figure 4:
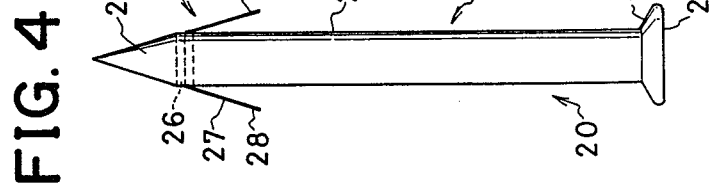

In FIGS. 4 and 5, it will be seen that the ceramic fiber layer fixing pin 20 in a preferred form of this invention is composed of a pin body 21 comprising a basal (principal) portion 24 which is to be inserted or driven into the ceramic fiber layers and an enlarged portion 25 designed to inhibit the insertion, and an elastic catch 22 provided on said pin body 21 close to its end and adapted or designed to be elastically deformable so that it will be anchored to the ceramic fiber layer(s). The end of the basal portion 24 positioned forward of the elastic catch 22 is tapered off to form a pointed end 23 to facilitate the insertion of the pin into the ceramic fiber layers. Said elastic catch 22 is embodied in this example as an elastic flap-like member 27 disposed in a lateral through-hole 26 in the basal portion 24 so that said member 27 projects out, as shown by 28, from both ends of said through-hole 26. The end of each projecting portion 28 is tapered off from one side in the longitudinal direction to form a knife edge to facilitate biting into the ceramic fiber layers. Said projecting portion 28 may be tapered toward both ends in the longitudinal direction of the flap-like member 27.

The basal portion 24 is preferably circular in sectional shape. Its sectional shape may be polygonal. It is desirable that said basal portion 24 has a uniform sectional shape along its full length.

The pin body 21 is made of a ceramic material with excellent heat resistance, such as silicon carbide ceramic. It is also possible to use silicon nitride ceramic.

The flap-like member 27 is made of an elastic material, for example, a thin and elongated metal sheet. Stainless steel is preferred as the metal material for said member 27, but other metals can be used.

The enlarged portion (stopper) 25 is so formed that it expands out endwise, and has a face 43 which abuts against the innermost ceramic fiber layer.

Figure 6:
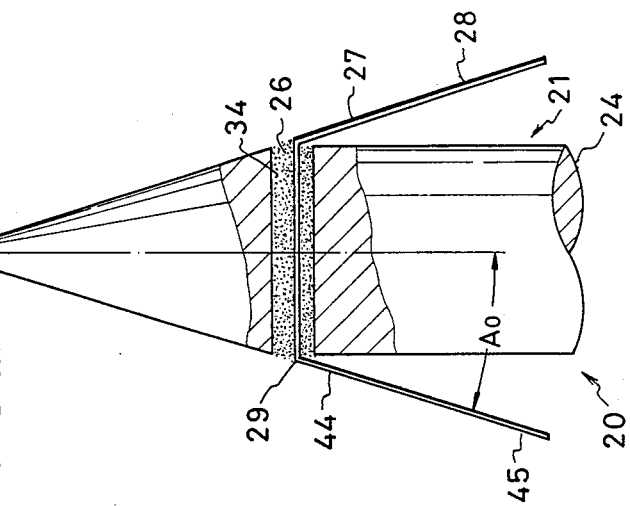
FIG. 6 is a schematic enlarged view of the end portion of the ceramic fiber layer fixing pin shown in FIGS. 4 and 5.

The detail of the pin 20 will be described with reference to FIG. 6 which shows an enlarged view of the fore end portion of the pin. It will be seen that a through-hole 26 is formed extending laterally through the basal portion 24, that is, said through-hole 26 extends transversely to the longitudinal direction of the pin body 21. The flap-like member 27 is disposed passing through said through-hole 26 such that said member 27 projects out from both ends of said through-hole 26. Said member 27 is bent at points 29 so as to make an angle of A0 with the axial line 30 of the pin body 21. The angle A0 is selected from the range of angles at which the pin 20 can be easily driven into the ceramic fiber layers and also the driven-in pin 20 can be properly fixed in the ceramic fiber layers. Each projecting portion 28 of the flap-like member 27 has a basal end portion 44 which is so designed that when the pin 20 is thrust into th ceramic fiber layers, said end portion 44 will be elastically deformed so as to approach the pin body 21 to allow easy insertion of the pin, and a distal end portion 45 which is so designed that when the inserted pin 20 undergoes a force acting to pull it back toward the enlarged portion side, said end portion 45 gets caught in the ceramic fiber layer(s) so as to begin an elastic deformation so that the projecting portion 28 will get away from the pin body 21. Instead of linearly bending the projecting portion 28 at the point 29, said portion 28 may be bent arcuately so that said portion 28 will be positioned closer to the pin body 21 at its basal end portion 44 to allow easy insertion of the pin 20 into the ceramic fiber layers but said projecting portion 28 will be positioned distant from the pin body 21 at its the distal end portion 45 so that the inserted pin 20 will readily get fixed in the ceramic fiber layers.

The spaces formed around the bends 29 and in the through-hole 26 having the flap-like member 27 passed therethrough are filled up with an adhesive 34 such as cement mortar, and thus said member 27 is secured to the pin body 21 in said through-hole 26.

In another embodiment of pin 20a according to this invention shown in FIG. 7, a curved through-hole 31 instead of the through-hole extending transversely to the longitudinal direction is formed in the basal portion 24a of the pin 20a, said through-hole 31 being curved so that it presents a convexity toward the tapering end 23 of the pin 20a, and a similarly configured flap-like member 27a is passed through said through-hole 31. Said through-hole 31, near its opening 35, has a slant making an angle A0 with the axial line 30a of the pin body 21a. The flap-like member 27a is curved in the through-hole 31 in conformity to its shape and projects out from both ends of the through-hole 31, the projecting portions being designated 28a. Each said projecting portion 28a is elastically deformable so as to approach the pin body 21a near the opening 35 of the through-hole 31 when the pin 20a is driven into the ceramic fiber layers.

In still another embodiment of pin 20b according to this invention shown in FIG. 8, a pair of flap-like members 27b. each having a projecting portion 28b, are provided in a pair of recesses 37 formed in the basal portion 24b of the pin 20b. Each said recess 37 has an inclined portion 38 inclined in the same direction as the taper 23, and an inclined portion 39 inclined in the opposite direction thereto so that each said flap-like member 27b can be effectively set in the corresponding recess 37 respectively. Each recess 37 may have other shapes.

In yet another embodiment of this invention shown in FIG. 9, the pin 20c is provided with a flap-like member 27c passed through a through-hole 26c and having the projecting portions 28c. Each projecting portion 28c has a basal end portion 44c bent at a point 29c to make an angle B0 with the axial line 30c of the pin body 21c and a distal end portion 45c further bent at a point 40 to make an angle C0 with the axial line 30c of the pin body 21c. The angle B0 is smaller than the angle C0. It is also smaller than the angle A0 made by the projecting portion 28 with the axial line 30 of the pin body 21 in the pin 20 of the previously described embodiment. Since the angle B0 is smaller than the angle A0, the driving of the pin 20c into the ceramic fiber layers is facilitated, and since the angle C0 is larger than the angle B0, the pin 20c can be more readily fixed in the ceramic fiber layers than the pin having no additional bend 40 when the pin 20c has been driven into the ceramic fiber layers.

In the pins 20, 20a, 20b and 20c of the above-described embodiments of the invention, there is provided a flap-like member 27, 27a, 27b or 27c having a pair of projecting portions 28, 28a, 28b or 28c, but any of said pins may be formed with two or more through-holes 26, 31, 26c or recesses 37 for providing two or more flap-like members 27, 27a, 27b or 27c on the pin body 21, 21a, 21b or 21c.

Also, in each of the pins 20, 20a, 20b, 20c of the above-described embodiments, a thin and elongated flap-like member 27, 27a, 27b, 27c is provided, but it may be substituted with a wire-like elastic member. In the latter case, the wire-like member may have a branch or branches.

In another form of pin 20d according to this invention, as shown in FIG. 10, the enlarged portion 25d has a flat abutment 41 (the face abutting against the innermost ceramic fiber layer), and in still another form of pin 20e shown in FIG. 11, the abutment 42 of the enlarged portion 25e is increased in thickness outwardly in the diametric direction.

The compressible and elastic ceramic fiber layers lining the wall of a furnace can be fixed by using the pins of preferred embodiments of this invention. Here, the process of fixing the innermost ceramic fiber layer 51 to the other or succeeding ceramic fiber layer or layers 52 lining a furnace wall 53 by using a pin 20, a preferred embodiment of this invention, will be described with reference to FIGS. 12 to 14. The ceramic fiber layer 52, to which the innermost ceramic fiber layer 51 is to be fixed by the pin 20, is already secured to the furnace wall 53 by other known type of pins welded or otherwise fixed to the furnace wall 53 in a way such that the pin 20 can be driven into said ceramic fiber layers 52 from the innermost layer 51 and that the flap-like member 27 of the driven pin 20 can get fixed in said layer or laminate layers 52. Said ceramic fiber layer 52 may be secured to the furnace wall 53 with an adhesive. The pin 20 is driven, with its tapering end 23 first, into said ceramic fiber layer 52 from the innermost layer 51 in such a way that a compressive force will be given to said ceramic fiber layers 51, 52 through the enlarged end portion 25 of the pin 20. Owing to the frictional force produced between each projecting portion 28 of the flap-like member 27 of the thus driven-in pin 20 and the ceramic fiber layers 51, 52, the basal end portion 44 of each said projecting portion 28 is elastically deformed so that the angle A1 made by said portion 28 with the axial line 30 of the pin body 21 decreases. When the pin 20 has been thrust to a point where the face 43 of the enlarged portion 25 abuts against the innermost ceramic fiber layer 51 and compresses said ceramic fiber layer 51 to give thereto an elastic strain so that a depression of a predetermined depth D is formed in said layer 51, any further insertion of the pin 20 into the ceramic fiber layers 51, 52 is inhibited by the enlarged portion 25. At this point, the angle A1 made by the basal end portion 44 of each said projecting portion 28 with the axial line 30 of the pin body 21 is reduced to A2. When the compressive force exerted to the ceramic fiber layers 51, 52 through the enlarged portion 25 is released, the elastic strain in the ceramic fiber layer 51 is removed to eliminate the depression of the depth D formed in the surface of the ceramic fiber layer 51, and at the same time the face 43 of the enlarged portion 25 abutting against the ceramic fiber layer 51 is given a force acting to pull back the pin 20 toward its enlarged end side. In this situation, the distal end portion 45 of said projecting portion 28 stays fixed in the ceramic fiber layer(s) 52 so that the angle A2 made by basal end portion 44 with the axial line 30 of the pin body 21 is increased to A3, and thus the projecting portion 28 is elastically deformed so that its distal end portion 45 gets away from the pin body 21.

The depth D of the depression given to the ceramic fiber layer 51 by the enlarged portion 25 of the pin 20 depends on the compressibility of said layer 51. The term "compressibility" used here means the property of the ceramic fiber layer 51 that it is elastically deformed after given an elastic strain by a momentary compression force.

The desired depth inhibited by the enlarged portion is the depth in which the pin body is inserted from the innermost ceramic fiber layer into the other ceramic fiber layer giving the elastic deformation to the ceramic fiber layer 51.

The angle A3 made by the basal end portion 44 of the flap-like member 27 with the axial line 30 of the pin body 21 when the elastic strain in the ceramic fiber layer 51 compressed to form a depression of the depth D is removed to eliminate said depression (see FIG. 14) is larger than the angle A2 made by said basal end portion 44 with the axial line 30 of the pin body 21 when the pin 20 has been driven into the ceramic fiber layers 51, 52 (see FIG. 13). The angle A3 is also larger than the angle Ao made by the basal end portion 44 with the axial line 30 of the pin body 21 before the pin 20 is thrust into the ceramic fiber layers 51, 52 (see FIG. 6). Said angle A3, however, is preferably smaller than 90° for allowing effective locking of the pin 20 in the ceramic fiber layers 52.

The pin 20 according to a preferred embodiment of this invention may be composed of a pin body 21 having a diameter of about 1 cm and a length of about 20 cm and a stainless steel-made flap-like member 27 having a thickness of 0.3 to 0.5 mm, said flap-like member 27 being passed through a through-hole 26 in the pin body 21 so that it projects out by a length of about 1 cm from both ends of said through-hole 26.

In a test where said pin 20 was used for fixing the innermost ceramic fiber layer 51 to the wall-side ceramic fiber layers 52 lining a heating furnace for rolling heated to a temperature of 1,300°-1,400° C. inside the furnace, the temperature around the flap-like member 27 secured to the ceramic fiber layers 52 was about 900° C. At this level of temperature, the ceramic fiber layers 52 suffer little change of thermal and mechanical properties with time, and the heat resistance of stainless steel constituting the flap-like member is also stabilized.

As described above, the ceramic fiber layer fixing pin according an embodiment of this invention can be easily driven into the ceramic fiber layers lining a furnace wall from any desired position on the innermost ceramic fiber layer and is thereby capable of securely fixing the innermost ceramic fiber layer to other ceramic fiber layers around the furnace wall. Since an additional ceramic fiber layer can be similarly secured on said fixed innermost ceramic fiber layer, it is possible to accomplish any desired multilayer lamination work of ceramic fiber layers with extreme ease and high reliability.

Also, even in case the ceramic fiber layer(s) in which the flap-like member of the pin is to be fixed is secured to the furnace wall by using an adhesive, the temperature of the area where the adhesive is applied can be kept in a range which is below the furnace temperature and in which the adhesive remains resistant to heat. Accordingly, heat deterioration of the adhesive is minimized and the risk of the lining coming off at the bonded section is reduced. Further, since the pin according to this invention does not reach the furnace wall when driven into the ceramic fiber layers, the heat loss that might be caused through the pin is limited. Furthermore, the lining of the furnace using the pin of the preferred embodiment of this invention may be easily repaired.

The ceramic fiber layer fixing pin according to this invention, in addition to the above-said uses, can be also used for fixing together all types of materials having compressibility and elasticity. Obviously, numerous modifications and variations of the present invention are possible in light of the above teachings. It is therefore to be understood that within the scope of the appended claims, the invention may be practiced otherwise than as specifically described therein.

What is claimed is:

1. A pin in combination with a plurality of ceramic fiber layers for fixing an innermost ceramic fiber layer of said plurality of ceramic fiber layers so as to line a furnace wall to at least one other ceramic fiber layer, situated at a side of said furnace wall with respect to said innermost ceramic fiber layer by being inserted from said innermost ceramic fiber layer into said other ceramic fiber layer, said plurality of ceramic fiber layers being compressible, said pin comprising:

a pin body made of a ceramic material and having a basal portion tapered at one end thereof so as to facilitate insertion of said pin into said other ceramic fiber layer from said innermost ceramic fiber layer, an enlarged portion connected integrally to the other end of said basal portion for inhibiting said insertion at a desired depth when said basal portion has been inserted into said other ceramic fiber layers from said innermost ceramic fiber layer, and a through-hole extending laterally through said pin body in the vicinity of said one end of said basal portion, and a flap-like radially outwardly expandable elastic catch anchored to said pin body in said through-hole and outwardly extending from said pin body prior to being inserted into said other ceramic fiber layer, said catch being made of a thin and elongated elastic member having an insertion portion inserted into said through-hole and two projection portions each projecting out from said through-hole, each of said projection portions being bent at an angle toward said enlarged portion, a distal end portion of said projection portion being further bent at an angle outwardly, said basal portion having at a portion opposed to said catch a cylindrical surface contacting said other ceramic fiber layer, whereby said catch is elastically deformable such that when said pin body has been inserted into said other ceramic fiber layer from said innermost ceramic fiber layer and said insertion has been inhibited by said enlarged portion, said catch is anchored to said other ceramic fiber layer at a position spaced from said innermost ceramic fiber layer to prevent said pin body from removal from said innermost ceramic fiber layer and said other ceramic fiber layer.

2. The pin of claim 1, wherein said enlarged portion is adapted such that when said pin has been inserted into said other ceramic fiber layer from said innermost ceramic fiber layer, said enlarged portion compresses said innermost ceramic fiber layer so as to produce an elastic strain in said innermost ceramic fiber layer and inhibits further insertion of said pin into said ceramic fiber layers, from said innermost ceramic fiber layer and when said elastic strain in said compressed innermost ceramic fiber layer is released, said enlarged portion receives a force acting to pull back said pin body toward said other end of said basal portion.

3. The pin of claim 2, wherein said catch projects sidewise from said basal portion of said pin body and is adapted such that when said pin has been inserted into said other ceramic fiber layer from said innermost ceramic fiber layer, said catch is elastically deformed so that said catch comes closer to said pin body to facilitate said insertion of said pin, and when said elastic strain in said innermost ceramic fiber layer is released, said catch is anchored to said other ceramic fiber layer to be able to begin an elastic deformation of said catch so that said catch is moved away from said pin body.

4. The pin of claim 1, wherein said enlarged portion has an abutment surface which abuts against said innermost ceramic fiber layer, said abutment surface increasing a diameter thereof at an outer circumference of said enlarged portion so as to compress said innermost ceramic fiber layer.

5. The pin of claim 4, wherein said abutment surface is formed flat so as to compress said innermost ceramic fiber layer.

6. The pin of claim 4, wherein said abutment surface projects toward said one end at said outer circumference thereof so as to compress said innermost ceramic, fiber layer.

7. The pin of claim 1, wherein said through-hole extends transversely to a longitudinal direction of said pin body.

8. The pin of claim 1, wherein said catch and said pin body are secured to each other by an adhesive located in said through-hole.

9. The pin of claim 1, wherein said elongated elastic member comprises a single elastic member passed through said through-hole.

10. The pin of claim 1, wherein said catch further comprises a metal member.

* * * * *